Aug. 31, 1965    F. HERBST    3,203,525
FRICTION CLUTCH
Filed March 4, 1963    3 Sheets-Sheet 1
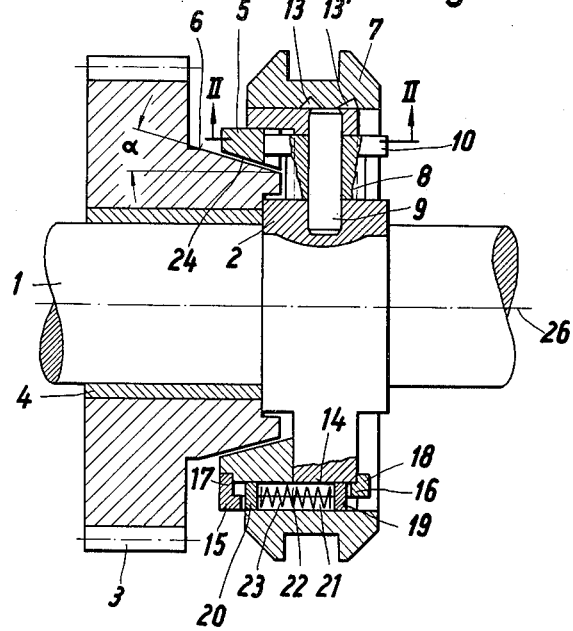
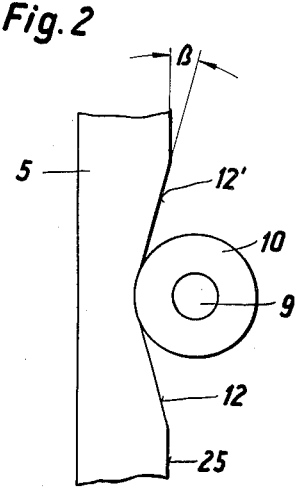
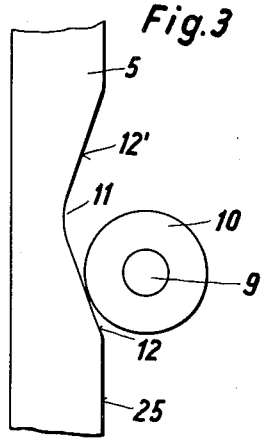

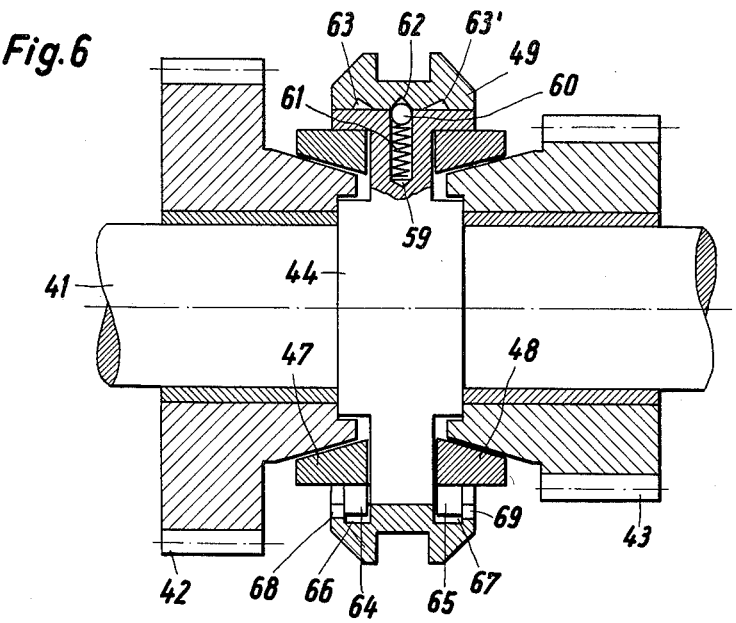
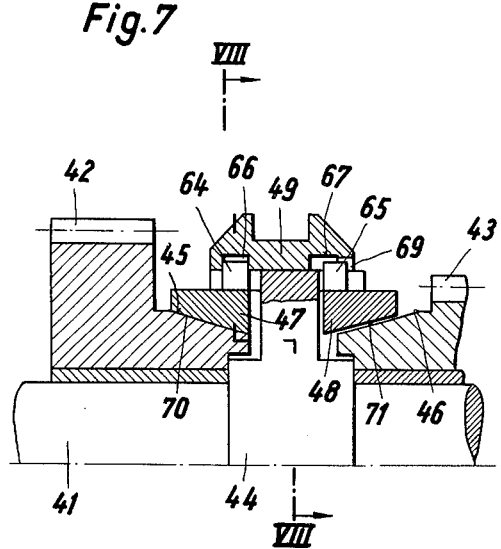
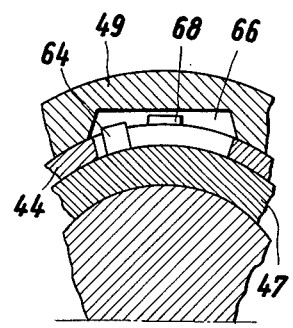

United States Patent Office 3,203,525
Patented Aug. 31, 1965

3,203,525
FRICTION CLUTCH
Fritz Herbst, Friedrichshafen, Germany, assignor to Zahnradfabrik Friedrichshafen, Aktiengesellschaft, Friedrichshafen, Germany
Filed Mar. 4, 1963, Ser. No. 262,669
Claims priority, application Germany, Mar. 21, 1962,
Z 9,309
11 Claims. (Cl. 192—66)

This invention relates to friction clutches and more particularly to the type of clutch which utilizes conical engaging elements, being particularly suitable for boat drive.

The present invention relates to single and double cone friction clutches of a kind heretofore known but wherein prior art clutches were relatively expensive due to being hydraulically operated. Such hydraulic operation requires pumps and sealing means and has the disadvantage that hydraulic pressure must be maintained at all times when the clutch is engaged. Further, such arrangements are subject to unreliability, due to temperature variations which cause fluctuation of pressure and uneven torque transfer.

The invention described herein overcomes the drawbacks set forth hereinabove and has, among its objects, the provision of a simple and relatively economical cone-type friction clutch wherein the engaging force and the force for maintaining engagement is produced by the torque transmitted.

Other objects and features will be apparent from the description that follows.

Briefly, the invention comprises a pair of conically shaped mating surfaces, one of which may be on a gear to be driven, and the other of which may be on a friction ring mounted on a rotating power shaft and which ring rotates therewith and has axial movement effected by planetary rollers acting against cam surfaces formed in an axial edge of the ring. The arrangement is such that initial axial movement of the friction ring causes it to engage the gear to be driven and slows it up with respect to the rotating shaft. The rotating shaft carries the rollers on radial shafts which, by virtue of the slowing up of the relative friction ring effects engagement between the rollers and the cam edges of the friction ring, forcing the ring axially into tight frictional drive engagement. There is a definite relationship between the angle conicity of the friction drive surfaces of the friction ring and the gear, on the one hand, and the angle which the cam surface formed on the axial edge of the friction ring makes with the rotational axis of the shaft, on the other hand. Thus, the product of the sine of half the former angle and the tangent of the latter angle should be greater than the coefficient of friction between the conical mating parts of the friction ring and the gear. When such a relationship is preserved, a practical clutch may be designed for any desired installation.

A detailed description of the invention now follows in conjunction with the appended drawing, in which:

FIG. 1 is an elevation in cross section of a single cone clutch of the invention;

FIG. 2 is a partial section on the line II—II of FIG. 1 while the clutch is disengaged;

FIG. 3 is a partial section similar to FIG. 2 when the clutch is engaged;

FIG. 6 is a section through VI—VI of FIG. 5;

FIG. 7 is a partial elevation showing positioning of the parts for engagement; and FIG. 8 is a section through VIII—VIII of FIG. 7.

Figure 4:
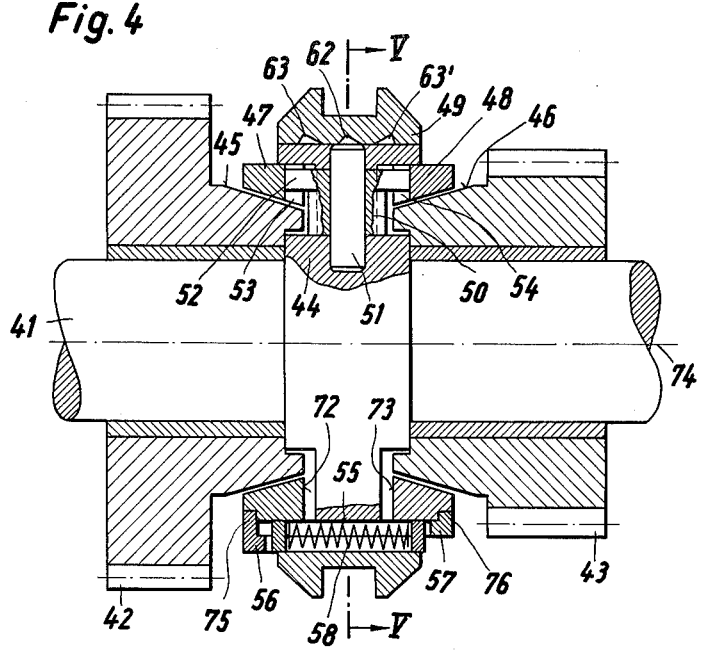
FIG. 4 is an elevation in cross section through a double cone clutch of the invention.

In the form of the invention shown in FIGS. 1–3, showing a single cone clutch, a power shaft 1 carries fixedly thereon a clutch carrier 2 on which is peripherally mounted an axially shiftable manually operable control sleeve 7 which effects axial shifting of a friction ring 5 with respect to carrier 2 for engagement with a gear 3 to be driven by the shaft. The elements 2, 5 and 7 rotate in unison, but ring 5 has a limited degree of rotative movement with respect to elements 2 and 7, as later explained. The gear 3 is rotatively mounted on shaft 1 via the bushing 4 and has a conical friction surface 6 of the angle α relative axis 26 of shaft 1 for drive engagement with a complemental conical surface 24 of ring 5. The carrier 2 has recesses such as 8 and carries respective shafts such as 9 extending radially into the recesses 8. The shafts carry respective rotative rollers 10 engageable with radial cam means comprising a pair of cam surfaces, such as 12 and 12', which are inclined at an angle β (FIG. 2) with respect to the radial inner edge 25 of friction ring 5 in a plane normal to the shaft axis. Force components in the direction of the axis 26 can be effected on surfaces 12 or 12' when engaged by the rollers 10. Thus, the rollers would normally be centrally disposed with respect to the inclined surfaces when the clutch is not engaged, as shown in FIG. 2. However, when the sleeve 5 is shifted axially to the left, engagement of the rollers with either of the inclined surfaces 12 or 12' occurs, depending on the direction of rotation of shaft 1 (see FIG. 3). This effect is due to the fact that ring 5 has, as heretofore mentioned, a limited degree of rotation with respect to carrier 2, by virtue of a construction which will be understood from consideration of FIGS. 4–8 but not shown in FIGS. 1–3. Thus, the carrier 2 will be understood to have an edge slot in which protrudes an actuating finger integral with friction ring 5 which extends into a groove of the control sleeve 7. This is identical with the construction of the double cone clutch of FIGS. 4–8 wherein the friction rings 45 and 47 have integral actuating fingers, such as 64 and 65 respectively (see FIG. 7 in particular) which pass through edge notches of clutch carrier 44 and into respective grooves of the control sleeve 49. It will be noted that the inner sides of the grooves are engageable with the respective fingers 64 and 65 and it will be thus understood that the control sleeve, when shifted axially, say, to the left, will push finger 64 and thus friction ring 45 to the left. Similarly, the same action occurs as to finger 65, if the control sleeve 49 were to be shifted to the right. However, the movement just described may be considered only for the left side of FIG. 7 since at the moment only a single cone clutch, as shown in FIG. 1, is under discussion. In any event, the shift of the friction ring to the left causes an initial engagement of the complemental conical surfaces 6 and 24 (FIG. 1) creating a drag on ring 5 to slow it relative to carrier 2, whereupon the relative rotation causes rollers 10 to engage the cam surface 12 or 12'. Referring again to FIG. 7, the arcuate length of groove 67 provides limited relative rotation of elements 2 and 5, sufficient to effect engagement of rollers 10 and the cam surfaces. A wedging action thus occurs to forcibly drive the ring 5 into frictional engagement with the gear cone surface and a very strong axial force maintains the surfaces in drive engagement by virtue of the rotation of carrier 2 as it transmits torque to overcome load resistance.

Figure 5:
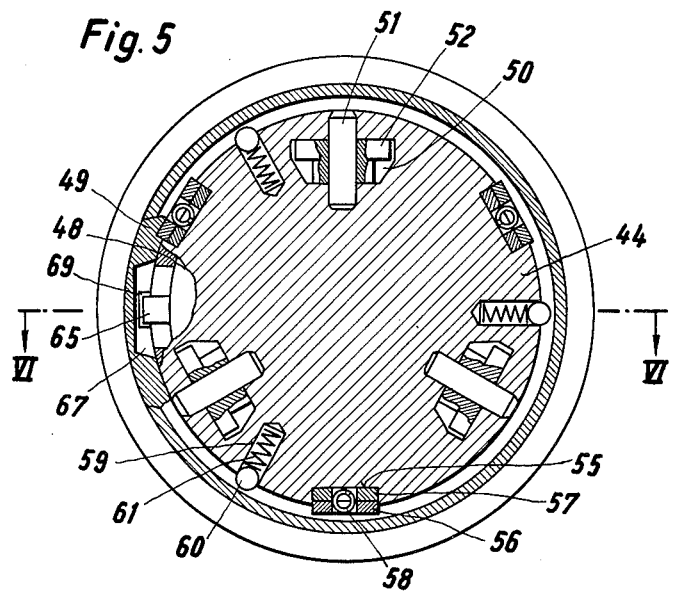
FIG. 5 is a section through V—V of FIG. 4.

As a safeguard to maintain the frictionally engaged condition of the gear 3 and ring 5, a ball detent is arranged which utilizes recesses 13 and 13' (FIG. 1), reference again being made to the double cone clutch shown in FIGS. 4–8 wherein corresponding recesses 62 and 63' are shown, which coact with respective balls 60 pressed by springs 61 into such recesses depending on the position of the control sleeve 49. Thus, as shown in FIG. 1, a detent ball (not shown) would be in recess 13 when the clutch is in neutral position, and in recess 13' when the clutch is engaged, it being understood that a plurality of such detent arrangements would be provided, as illustrated in FIG. 5, by the balls 60.

In order to maintain a normally non-engaged condition of ring 5, it is spring-biased away from gear 3. Thus, the control sleeve 7 and the clutch carrier 2 have axial shifting displacement with respect to each other, being in effect slidably splined, but rotate in unison as heretofore mentioned. This is effected by a plurality of pairs of slidably related plates 15 and 16 carried in a recess 14 of the carrier 2, only one pair being shown. Several such sets of plates, which are superimposed on each other, are used and reference is made to FIG. 5, plates 56 and 57 in recess 55, to show the construction. Each plate 15 has an upstanding tab 17 at one end fitting into a recess of the friction ring 5 for support of the ring. The other end of the plate is fashioned with an additional upstanding tab 19 which fits longitudinally slidably into a slot 22 in plate 16 which has an upstanding tab 18 that longitudinally abuts the carrier 2, as shown. The other end of plate 18 has a downwardly turned tab 20 which fits longitudinally slidably into a slot 21 in plate 15. Thus, the two plates are relatively slidable in an axial direction with respect to each other, and a compression spring 23 in the slots and acting against the tabs 19 and 20 bias the end tabs 17 and 18 toward each other, which tabs, acting on ring 5 and carrier 2 respectively, retain the ring in withdrawn or disengaged condition. In this condition, it will be understood that a spring-pressed ball is in the neutral recess 13.

Accordingly, when it is desired to engage the clutch, control sleeve 7 is shifted to the left against the bias of the springs 23 (one shown) until the detent balls (not shown) are in respective recesses 13' (one shown) which are specifically designed to retain control sleeve 7 in shifted position against any reverse movement which might be occasioned by the compressive forces in the springs 23. The connection between the control sleeve 7 and the ring 5, as hereinabove described in conjunction with FIGS. 4–8 by way of a finger such as 64 or 65, requires the interdependence of axial movement of the control sleeve and the friction ring. However, by way of the arcuate extent of the grooves (not shown) in the control sleeve (corresponding to the grooves 67 of FIG. 5) a limited degree of relative rotation between the friction ring 5 and the control sleeve is provided for, depending of course, as mentioned, on the angularity between the radial cam edges 12 and 12'. Such degree of relative rotation permits rotation of the carrier 2 relative the ring 5 so as to effect the engagement of the planetary rollers 10 with the cam surfaces 12 or 12' when the ring 5 is slowed up by initial engagement with gear 3, as will now be clear.

In the form of the invention shown in FIGS. 4–8, the construction is such as to permit drive engagement of either of two gears, 42 or 43, with the drive shaft 41. Thus, the gears are rotatively mounted on the shaft and have conic surfaces 45 and 46 (FIG. 4), respectively, engageable with complemental surfaces 70 and 71 (FIG. 7), respectively, of friction rings 47 and 48 carried via pairs of plates 56 and 57 in recesses 55 in the clutch body or carrier 44, which plates are encompassed and radially retained by axially shiftable control sleeve 49 and have springs 58 in slots between each coacting set of plates, each such plate pair being thus supported within and slidable in its respective recess 55.

The tabs 75 and 76 of the plates 56 and 57 restrain the respective friction rings 47 and 48 against moving into engagement with the conic surfaces 70 and 71 of the gears, and it will be understood that the inner axial edges of the friction rings at 72 and 73 (FIG. 4) are provided with the inclined camming surfaces 53 of the form shown in FIGS. 2 and 3, wherein such surfaces have axial force components thereon in the direction of the shaft axis 74 (FIG. 4) when engaged by the respective rollers 52 on shafts 51 in recesses 50 of carrier 44.

The interlocking and slidability of the plates 56 and 57, by virtue of their slots and tabs with intermediate springs 58, is as heretofore described in connertion with FIGS. 1–3 and such coaction maintains the friction rings 47 and 48 in neutral position whereat the detent balls 60, biased by respective springs 61 are maintained in respective neutral position recesses 62 of the control sleeve 49. However, by virtue of the slidability of the control sleeve with respect to the carrier 44, which are slidably splined to each other by the plates 56 and 57, such control sleeve can be shifted axially left or right to effect the initial engagement of the conical surfaces of friction rings and respective gears whence the limited relative motion permitted by the slot 67 permits carrier 44 to rotate a sufficient degree so that the rollers 52 can ride in one direction or the other against the cam surfaces 53 (FIG. 4). In either shifted position, the detent balls coact with recesses 63 or 63' to maintain the engaged condition and with sufficient detent action to overcome the recovery bias of the springs 58.

In order to permit left or right axial motion of control sleeve 49, it is necessary to provide notches, such as 68 (FIG. 8) and 69 (FIG. 5) so that the respective fingers 64 and 65 will not be blocked by the outer walls of the respective grooves 66 and 67 of the control sleeve into which grooves the fingers protrude. Thus, when the clutch is in neutral position (FIG. 6), the fingers 64 and 65 are initially aligned with the respective notches 68 and 69 in the outer walls of the grooves so that the control sleeve will be free to move axially by virtue of finger 64 passing through notch 68 when the control sleeve moves to the right, the same action ensuing for finger 65 and notch 69 when the control sleeve moves to the left.

Referring to the various recesses, such as 13', 63, and 63', of the modifications disclosed, it will, of course, be understood that they are suitably designed so that they will hold the friction rings in engaged position against the return bias of springs 58, having slanted sides for that purpose.

A clutch built in accordance with the above disclosure has been found to require only two to three kg. of shifting force on the control sleeve for a speed of 1500 r.p.m. The actual mathematics involved for the design of such a clutch for the transfer of a maximum degree of torque without slipping should be:

$$\tan \beta \cdot \sin \alpha > \mu$$

where $\mu$ is the coefficient of friction. Further, in order to avoid disengagement under load, the following condition is to be observed:

$$\frac{\mu_H}{\tan \beta \cdot \sin \alpha} > 1$$

wherein $\mu_H$ is the coefficient of friction for static conditions (before the clutch slips).

The force with which the friction ring is pressed into engagement may be determined by the formula:

$$P = \frac{M d_M}{r \cdot \tan \beta}$$

In the above formula $Md_M$ is the motor torque acting on the shaft and $r$ is the median radius of the engaging cone surfaces.

The principle of the invention is not thought to be restricted to cone clutches but could, in fact, be utilized with flat disc clutches as well.

Having thus described my invention, I am aware that various changes may be made without departing from the spirit thereof and, therefore, do not seek to be limited to the precise illustration herein given, except as set forth in the appended claims.

I claim:

1. In a clutch of the class described, a rotative shaft, a clutch carrier mounted on said shaft and rotatable therewith, a driven element to be coupled to said shaft for torque transmission, a friction ring carried on said shaft and having a radial cam disposed to exert axial thrust on said friction ring, said friction ring being axially shiftable for drive engagement with said driven element, and a cam element rotative with said carrier having a camming coaction with said radial cam, said friction ring being supported so as to have a predetermined degree of rotation relative to said cam element, means operative to bring said cam element and said radial cam into engagement, to effect an axial force component on said friction ring during the course of relative rotation between said friction ring and said cam element, said clutch carrier having a slot, including a control sleeve having an arcuate internal groove and encompassing said carrier, said friction ring having a finger extending radially through said slot and into said groove and engageable with a wall of said groove for effecting axial movement of said friction ring upon axial movement of said control sleeve.

2. In a device as set forth in claim 1, biasing means for effecting a drive disengaging position of said friction ring, said biasing means comprising relatively slidable elements intermediate said carrier and said control sleeve, and comprising a spring disposed between said elements, one of said elements being disposed for longitudinal abutment against said friction ring whereby said spring normally retains said friction ring biased toward said carrier, said carrier and said control sleeve having radially aligned recesses for retaining said elements whereby said carrier and said control sleeve are slidably splined to each other.

3. In a clutch as set forth in claim 2, including detent means intermediate said carrier and said control sleeve for effecting holding positions of said control sleeve with respect to said carrier for engaged and disengaged drive.

4. In a clutch of the class described, a rotative shaft, a clutch carrier mounted on said shaft and rotative therewith, a driven element to be coupled to said shaft for torque transmission, a friction ring carried on said shaft having a cam surface, said friction ring being axially shiftable for drive engagement with said driven element, and a cam element rotative with said carrier having a camming coaction with said cam surface, said friction ring being supported so as to have a predetermined degree of rotation relative said cam element operative to bring said cam element into engagement with said cam surface to effect an axial force component on said friction ring during the course of relative rotation between said friction ring and said cam element, said cam surface comprising a radial edge on said friction ring inclined at a predetermined angle with respect to a plane normal to the axis of said shaft, said friction ring and said driven element having complemental conical engageable surfaces of predetermined angle with respect to the axis of said shaft, wherein the product of the tangent of said former angle and the sine of the latter is at least equal to the coefficient of friction between the concial surface.

5. In a clutch of the class described, a rotative shaft, a clutch having a body mounted on said shaft and rotative therewith, a driven element mounted on said shaft to be coupled thereto by said clutch, a friction ring having a radial cam edge and being axially shiftable for engagement with said driven element, and planetary roller means carried by said body for camming coaction with said cam edge, means supporting said friction ring so as to have a predetermined degree of relative rotation with respect to said body to bring said roller means into engagement with said cam edge thereby effecting an axial force on said friction ring during the course of said relative rotation, and means whereby said friction ring may be initially engaged with said driven element to slow the rotation of said friction ring relative said body for effecting said relative rotation, including a control sleeve encompassing said body and carried thereon, means for slidably splining said control sleeve to said body and for biasing said friction ring into disengaged position, said means comprising a pair of relatively slidable slotted plates intermediate said control sleeve and said body and slidably retained in radially aligned recesses thereof, the slots of said plates being radially aligned and a spring retained therein, said plates having tabs abutted by opposite ends of said spring and said plates having additional tabs longitudinally abutting said friction ring and said body.

6. A double cone clutch, comprising a rotative power shaft, a clutch body integrally rotative therewith, a control sleeve rotative with said body and slidably splined thereon, a driven element on each side of said body to be coupled to said shaft, a respective friction ring carried by said body for each of said driven elements, complemental conical frictionally engageable drive surfaces for said friction rings and said driven elements, said friction rings being axially movable to selectively effect engagement of said surfaces, fingers carried by said friction rings and extending radially into respective grooves of said control sleeve and engageable by an inner wall of a respective groove for effecting axial shift of a respective friction ring, an outer wall of each groove being provided with a notch for emergence of respective fingers from respective grooves whereby when said control sleeve effects axial shifting of a friction ring via the finger thereon, the finger of the other friction ring passes through the respective notch in order to avoid interference with the respective outer wall of the respective groove.

7. In a clutch of the class described, a rotative shaft, a clutch having a body mounted on said shaft and rotative therewith, a driven element mounted on said shaft and having a friction drive surface, a friction ring comprising a first cam element, and having a friction drive surface engageable with said first-mentioned friction drive surface when moved axially in the direction thereof, and being axially shiftable for engagement of said surfaces, and a second cam element comprising a roller rotative with said body about the shaft axis, and means mounting said roller for rotation about its own axis wherein said latter axis is radial to said shaft, for engagement with said first cam element, support means supporting said friction ring so as to have a predetermined degree of relative rotation with respect to said body to bring said cam elements into engagement during the course of said relative rotation to drivingly engage said surfaces for torque transmission to said driven element, and means whereby said surfaces may be initially engaged to slow the rotation of said friction ring relative to said body for effecting said relative rotation.

8. In a clutch of the kind described, a rotative shaft, a clutch having a body mounted on said shaft and rotative therewith, a driven element mounted on said shaft and having a friction drive surface, a friction ring means comprising a first cam element, and having a friction drive surface engageable with said first-mentioned friction drive surface, and being axially shiftable for engagement of said surfaces, and a second cam element rotative with said body for engagement with said first cam element, means supporting said friction ring so as to have a predetermined degree of relative rotation with respect to said body to bring said cam elements into engagement during the course of said relative rotation to drivingly engage said surfaces for torque transmission to said driven element, and means whereby said surfaces may be initially engaged to slow the rotation of said ring relative to said body for effecting said relative rotation, said second cam element comprising a roller, a recess in said body and a radial shaft in said recess, said roller being rotative on said shaft.

9. In a clutch of the class described, a rotative shaft, a clutch carrier mounted on said shaft and rotative therewith, a driven element to be coupled to said shaft for torque transmission, a friction ring carried on said shaft and a radial cam thereon and rotative therewith and disposed to exert axial thrust on said friction ring, said friction ring being axially shiftable for drive engagement with said driven element, and a cam element rotative with said carrier having a camming coaction with said radial cam, said friction ring being supported so as to have a predetermined degree of rotation relative to said cam element to effect an axial force component on said friction ring through said radial cam, said radial cam comprising a radial edge of said friction ring, said friction ring having a conical internal friction surface terminating at one face of said friction ring, and at an opposite face terminating at said radial edge.

10. In a clutch of the class described, a driving shaft and driven elements carried on said shaft, a clutch carrier collar rotative with said driving shaft, one each of said driven elements being on a respective side of said clutch carrier, a friction ring on each side of said clutch carrier collar and carried thereby and being axially movable for engagement with respective driven elements, each of said friction rings have a cam surface facing said clutch carrier collar and means whereby said friction rings have relative rotation with respect to said clutch carrier collar, a cam element carried by said clutch carrier collar and movable with respect to said cam surfaces of said friction rings to effect axial shift of said friction rings in respective directions upon relative rotation between said clutch carrier collar and a respective friction ring, and means for shifting either of said friction rings in the direction of the respective driven element.

11. In a device as set forth in claim 10, said cam element comprising a roller and a shaft therefor carried radially by said clutch carrier collar, said friction rings each comprising a respective radial edge facing said clutch carrier collar and said edges comprising respective cam surfaces.

References Cited by the Examiner

UNITED STATES PATENTS

| | | | |
|---|---|---|---|
| 2,081,824 | 5/37 | Lambert | 192—32 |
| 2,942,712 | 6/60 | Altmann | 192—66 |
| 2,993,579 | 7/61 | Altmann | 192—66 X |

FOREIGN PATENTS 682,843  10/39  Germany.

DAVID J. WILLIAMOWSKY, *Primary Examiner.*